United States Patent
Chatenet

(10) Patent No.: US 6,679,455 B2
(45) Date of Patent: Jan. 20, 2004

(54) POINTING DEVICE AND AN ONBOARD POINTING SYSTEM

(75) Inventor: Luc Chatenet, Cesson (FR)

(73) Assignee: SNECMA Moteurs, Paris (FR)

( * ) Notice: Subject to any disclaimer, the term of this patent is extended or adjusted under 35 U.S.C. 154(b) by 311 days.

(21) Appl. No.: 09/954,416

(22) Filed: Sep. 17, 2001

(65) Prior Publication Data

US 2002/0033796 A1 Mar. 21, 2002

(30) Foreign Application Priority Data

Sep. 18, 2000 (FR) .............................................. 00 11859

(51) Int. Cl.[7] ................................................. B64G 1/10
(52) U.S. Cl. .................... 244/158 R; 248/584; 248/581
(58) Field of Search .......................... 244/158 R, 118.1, 244/165, 51, 66, 169; 248/564, 581, 584, 589, 593, 595, 603, 608; 403/291; 74/27, 20, 21

(56) References Cited

U.S. PATENT DOCUMENTS 2,532,755 A  * 12/1950 Bloomfield
4,060,315 A     11/1977 Heinz
5,112,012 A  *  5/1992 Yuan et al.
5,131,611 A  *  7/1992 Vollaro
5,261,631 A  * 11/1993 Bender et al.
5,452,548 A  *  9/1995 Kwon
5,740,699 A  *  4/1998 Ballantyne et al.
5,808,439 A     9/1998 Spanenberg
5,820,078 A  * 10/1998 Harrell

FOREIGN PATENT DOCUMENTS

WO            97/12806         4/1997

* cited by examiner

Primary Examiner—Tien Dinh
(74) Attorney, Agent, or Firm—Weingarten, Schurgin, Gagnebin & Lebovici LLP

(57) ABSTRACT

To support and point a load on a support element, the pointing device having distinct link arms distributed around the load. Each link arm having a flexible element having a first end connected to the support element via a first hinge having a single degree of freedom, and a second end connected to the load via a second hinge having a single degree of freedom. The pointing device also having at least one movement transmission element disposed between the support element and the load to point the load relative to the support element.

17 Claims, 5 Drawing Sheets

POINTING DEVICE AND AN ONBOARD POINTING SYSTEM

FIELD OF THE INVENTION

The present invention relates to a pointing device for supporting and pointing loads or components in a determined position. More particularly, the invention relates to precision pointing devices for placing in unstable environments that impart vibrations or multiple movements to such systems. In addition, the invention also relates to pointing systems on board space vehicles such as those used in satellites, exploration modules, or space probes.

PRIOR ART

In numerous fields, and in particular in the aerospace, detection, or telecommunications fields, some of the components used need to be pointed or steered with great accuracy. The loads or components concerned are any type of apparatus that needs to be accurately pointed in order to operate. By way of example, such components can be plasma thrusters for correcting the position of a satellite in orbit, transceiver antennas, mirrors, . . . In such applications, the components are associated with a pointing device or mechanism which is designed to support the components and to place them in a determined position. A component and its pointing mechanism once in association form an assembly which implements both the pointing function and the function of the component.

By way of example, when pointing plasma thrusters for correcting satellite orbits or when pointing satellite antennas, the range of values over which the entire component and pointing mechanism assembly can move is of the order of a few degrees. Thus, the reliability of the mechanisms both in terms of strength and in terms of precision determines whether or not the components they support operate properly.

Two problems arise with onboard components, i.e. components which need to be transported to the site at which they are to operate, e.g. those used in satellites that need to be placed in orbit by means of a rocket. Firstly, during transport, the pointing mechanism which supports the component must be capable of holding the component in a safe position while also guaranteeing proper mechanical behavior for protecting the component as far as possible against the significant stresses and vibrations due to accelerations. Secondly, the pointing mechanism must then be capable of becoming operational, i.e. the mechanism must have retained a predetermined orientation or must be capable of being moved so as to point the component into a determined position.

Concerning components that need to operate during transport or in an environment that is highly disturbed (vibration, impact, acceleration, . . . ), the two above-identified problems amount to a single problem. Under such circumstances, the system must be capable of protecting the component as much as possible from the mechanical disturbances generated by its conditions of use while simultaneously ensuring that the component is pointed precisely.

Considering such problems, numerous pointing systems have been devised, however they generally present mechanical structures that are very complicated, thereby significantly increasing the mass and the cost of the assembly to be transported or to be used without genuinely protecting the supported component from shock or vibration during transport or in operation.

Amongst known pointing systems, there are mechanisms making use of cardan mounts or of shafts. Those systems suffer from a major drawback associated with the hinge elements used. Cardan mounts or shafts as used in such systems cannot hold the component stably, and they transfer a large amount of vibration to the component during transport. In order to keep the assembly in a stable position during transport, solutions involving locking the pointing system have been considered. By way of example, they consist in a device of the kind described in "High performance reactionless scan mechanism", by E. I. William, R. T. Summers, M. A. Ostaszewski, Ball Aerospace, 29th Aerospace Mechanism Symposium, NASA Conference Publication 3293, which device presents a pointing mechanism with cardan mounts that are "locked" via the actuators for launch purposes. Nevertheless, in such a mechanism, the cardan mounts are prevented from moving only via the actuators which leaves the cardan mounts with a certain amount of slack that is sufficient for transmitting undesirable vibration to the load.

Another solution, described in the document "Thruster orientation mechanism", by S. Mankai, Alcatel Space Industries, 8th European Space Mechanisms and Tribology Symposium, ESA SP-438, consists in a plasma thrust pointing system which comprises two plasma thrusters disposed on a common plate carried by silicone dampers and a two-axis cardan mount fitted with ball bearings. That system is pointed by linear actuators placed on roller screws. The entire mechanical structure of that system is locked by an assembly of holding plates and bolts fitted with apparatus including pyrotechnical cutters for releasing the assembly on its site of operation. That solution is unsatisfactory since shocks due to the pyrotechnical devices are undesirable on sensitive components such as plasma thrusters. In addition, the system is very heavy, having a mass of 17 kilograms (kg) even though the maximum mass required for that type of system in a plasma thrust application for a satellite is no more than 8 kg. Finally, apart from its large mass, that system continues to be highly vibratory.

OBJECT AND BRIEF SUMMARY OF THE INVENTION

The present invention seeks to remedy the above-mentioned drawbacks and to provide a pointing device that is simple and capable, in a single structure, of combining the functions of stabilization and of pointing.

These objects are achieved by means of a pointing device for supporting a load on a support element, the load being supported above the support element by moving link means, wherein the moving link means comprise at least three distinct link arms distributed around the load, each link arm comprising a flexible element having a first end connected to the support element via a first hinge having a single degree of freedom, and a second end connected to the load via a second hinge having a single degree of freedom, and wherein the pointing device further comprises at least one means for transmitting movement disposed between the support element and the load to point the load relative to the support element.

The device of the invention thus makes it possible to connect a load to a support element via backlash-free links, thus giving additional stiffness to the assembly while conserving a certain amount of mobility for pointing.

In a particular aspect of the invention, the load also comprises a fixing bracket connected to the link arms.

In an aspect of the invention, in each link arm, the first hinge has a first pin supporting the first end of the flexible element, the first pin being fixed to the support element by a fixing member, and the second hinge comprises a second pin supporting the second end of the flexible element, the second pin being fixed to the load by a fixing member, the first and second pins of each link arm being parallel to each other and perpendicular to the flexible element when the device is in its initial position.

Thus, by means of these hinges assembled to each of its ends, and because of the flexible element which is connected to said hinges, each link arm retains stiffness necessary for supporting the load while nevertheless remaining movable in various directions so as to allow the supported load to be pointed in a determined direction.

According to a characteristic of the invention, the movement transmission means comprises an actuator formed by a stator element fixed to the support element, the stator element supporting a turntable having a retaining element fixed eccentrically on the turntable and having attached thereto a first ball-and-socket joint disposed at one end of a connecting rod, a second ball-and-socket joint disposed at the opposite end of the connecting rod being attached to a retaining element disposed on the supported load, the first and second ball-and-socket joints provided at the ends of the connecting rod being free to rotate about their respective retaining elements.

With this type of actuator, the device can be pointed in numerous directions without the actuator being directly connected thereto, thus avoiding increasing the weight of the load and avoiding transmitting additional vibration thereto.

According to another characteristic of the invention, the movement transmission means comprises an actuator formed by a stator element fixed to the support element, the stator element supporting a turntable having a first hinge with a single degree of freedom fixed eccentrically on the turntable and connected to a first end of a flexible element, the second end of the flexible element being connected to the load via a second hinge having a single degree of freedom.

The stiffness of the device as a whole can be further increased by making backlash-free links for the movement transmission means in this way.

In an aspect of the invention, the stator element comprises a motor for positioning the turntable.

The device can thus point the load it supports as a function of control relationships applied to the actuators.

In another aspect of the invention, the stator element comprises a mechanism for driving the turntable, the mechanism being irreversible.

With such an irreversible mechanism, the load can be held in a predetermined orientation without the actuators being powered.

In an aspect of the invention, the flexible element comprises a laminated structure made up of a stack of a plurality of laminations.

Such a structure provides a compromise between the flexibility and the stiffness required by each flexible element to ensure the load support is stable and capable of being pointed.

More particularly, each of the laminations of the plurality of laminations comprises a metal lamination covered in a resilient material.

Thus, the presence of metal in the laminations ensures that each flexible element is stiff, with contact flexibility between the laminations being obtained by the elastic coating material.

Specifically, the metal constituting the lamination is stainless steel and the resilient covering material is vulcanized rubber or silicone compression-bonded onto the metal.

For use in air, it is preferable to use vulcanized rubber, whereas for use in a vacuum, silicone is more suitable.

More particularly, the device comprises two movement transmission means disposed in two distinct directions.

The load can then be pointed through two angles of inclination.

In an embodiment of the invention, the moving link means comprise four link arms disposed uniformly around the supported load.

The device constituted in this way advantageously constitutes the beginning of a square-based pyramid structure on which the load is supported.

In another embodiment of the invention, the moving link means comprise five link arms distributed uniformly around the supported load.

The device constituted in this way advantageously forms the beginning of a pentagon-based pyramid structure on which the load is supported.

In a particular aspect, the support element is a portion of the external structure of an apparatus.

Still in a particular aspect of the invention, the load comprises a plasma thruster, an antenna, a light emitter, or a light receiver.

The device of the invention makes it possible to support and point loads constituted by fragile elements even in unstable environments.

The present invention also provides a pointing system comprising a plurality of pointing devices as described above, the devices being placed side by side and two adjacent devices using at least one movement transmission means in common.

The devices are thus pointed in series by common movement transmission means on which the forces exerted via the connecting rods come into balance.

The invention also provides a system on board a launcher, the system comprising apparatus with at least one load supported by a pointing device as described above.

Consequently, the device of the invention provides a solution that is inexpensive and reliable for launching space vehicles fitted with loads containing elements that are sensitive to vibration and acceleration of any kind.

BRIEF DESCRIPTION OF THE DRAWINGS

Other characteristics and advantages of the invention appear from the following description of particular embodiments of the invention, given as non-limiting examples, and described with reference to the accompanying drawings, in which.

DETAILED DESCRIPTION OF EMBODIMENTS OF THE INVENTION

Figure 1:
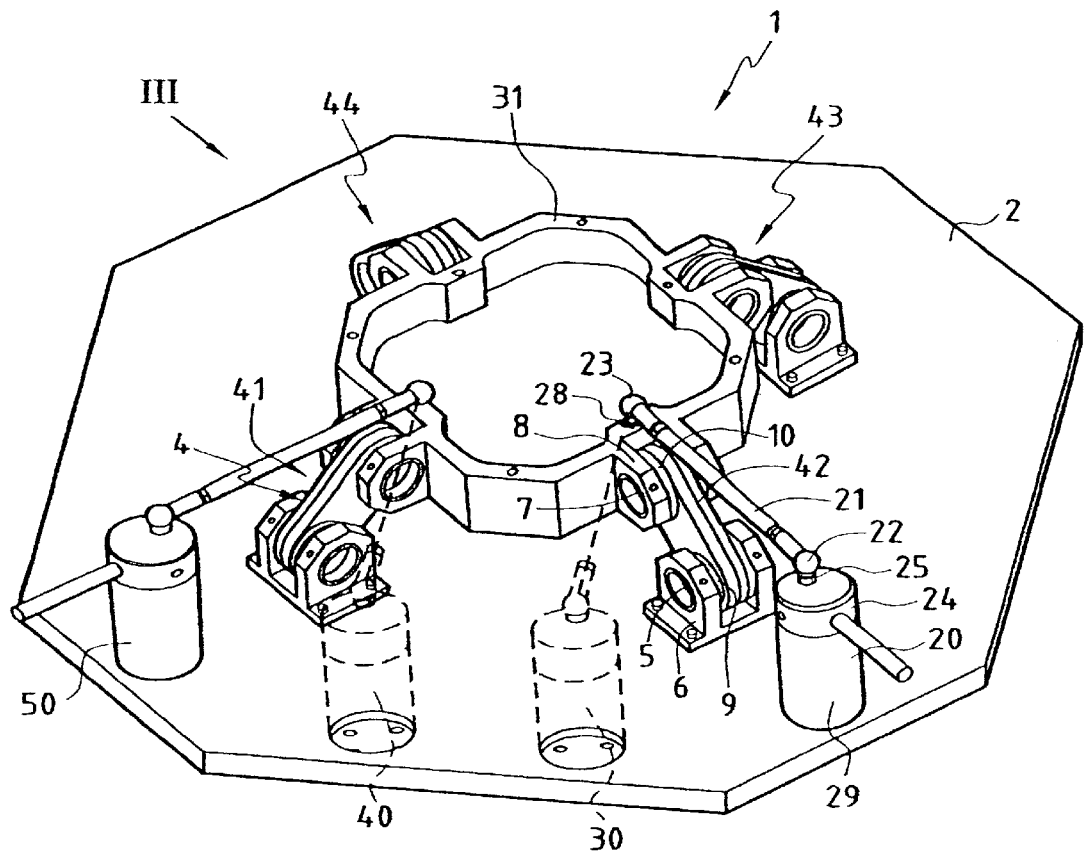
FIG. 1 is a diagrammatic perspective view of a pointing device constituting an embodiment of the invention.

FIG. 1 shows a pointing device constituting an embodiment of the invention. The device of the invention can be used for supporting and pointing a load. The term "load" is used to mean any element or component that is sensitive to disturbances such as vibration, shock, or acceleration, and/or that needs to be pointed accurately, such as a thruster, an antenna, or a light emitter or receiver. The pointing device 1 bears against a support element 2. When it is in the form of an independent support plate, as shown in FIG. 1, the support element has the basic function of supporting the device in order to support a load or a component via the device 1, thus forming a distinct assembly of an apparatus.

Alternatively, the device of the invention can connect an apparatus directly to the load or the component that is to function thereon. The support element 2 can be fixed directly to the apparatus. In which case, such a support element can also be an integral portion of the external structure of the apparatus onto which the pointing device 1 is to be fixed.

In order to clarify the description of the structure and the operation of the pointing device of the present invention, the pointing device is initially presented as being connected solely to a bracket 31 without any supported load and without being connected to the structure of an apparatus. The bracket 31 can either be a support base onto which the load is fixed, or else a structural element of the load itself. It is explained below how the device can be integrated in the structure of an apparatus and how it can include a load for pointing that is used by the apparatus.

Figure 2:
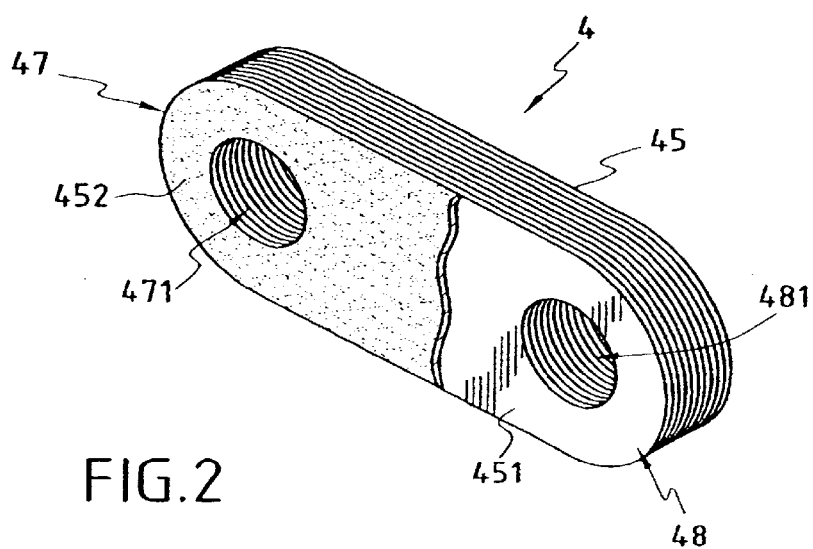
FIG. 2 is a diagrammatic perspective view showing a laminated structure in an embodiment of the invention.

The pointing device 1 of FIG. 1 has four moving link arms 41, 42, 43, and 44 which support the bracket 31. Each link comprises a flexible element which can be constituted by a laminated structure 4. FIG. 2 shows a laminated structure 4 made up of a stack of a plurality of laminations 45 each comprising a piece of metal 451, such as stainless steel, covered in a resilient coating 452 which can be constituted by a vulcanized rubber if the device is for use in air, or by silicone compression bonded if the device is for use in a vacuum, since silicone behaves better than rubber in a vacuum. The laminations 45 are juxtaposed side by side to obtain a laminated structure 4 in which they present mutual contact surfaces constituted by a flexible damping material. This structure makes it possible to obtain laminations that are sufficiently stiff because of the presence of the metal, while nevertheless presenting a certain amount of flexibility in bending/twisting because of the resilient coating. The nature of the materials from which the laminations are made and the dimensions and number of laminations are a function of the degree of stiffness or flexibility that it is desired to obtain in the resulting laminated structure 4.

As shown in FIGS. 1 and 2, each laminated structure 4 comprises a first end 47 closer to the support element and including a circular opening 471 for receiving a first pin 5 which is held on the support element by a fixing member 6, in this case in the form of a fork having a soleplate that rests on the support element 2. The structure 4 also has another circular opening 481 at its second end 48 which receives a second pin 7, held to the bracket 31 by a fixing member 8 similar to the fork 6.

Together with their respective pins, the two ends of the flexible element constituted by the laminated structure 4 form first and second hinges 9 and 10, each having a single degree of freedom for the moving link arm. Hinges having a single degree of freedom can be made using flexible pivots or pairs of biased ball bearings, thus providing backlash-free links.

When the device is in its initial position, i.e. when no particular orientation is imposed on the device, the first and second pins 5 and 7 of each moving link arm are parallel in a plane perpendicular to the plane of the flexible element of the arm in question.

The structure of the pointing device of the invention as constituted in this way makes it possible to avoid having direct mechanical links between the support element 2 and the bracket 31 which is the attachment point for the load of the device. In other words, the moving link means of the device of the present invention make it possible to establish backlash-free links which, unlike hinged links such as cardan mounts or ball-and-socket joints, present rigidity which considerably minimizes the propagation to the load of external movements exerted on the support element 2. Moving links of the invention are hinged at their ends about respective pins with a single degree of freedom. The flexibility of the laminated structures 4 provide the other degrees of freedom in movement that are necessary for pointing the load.

Figure 3:
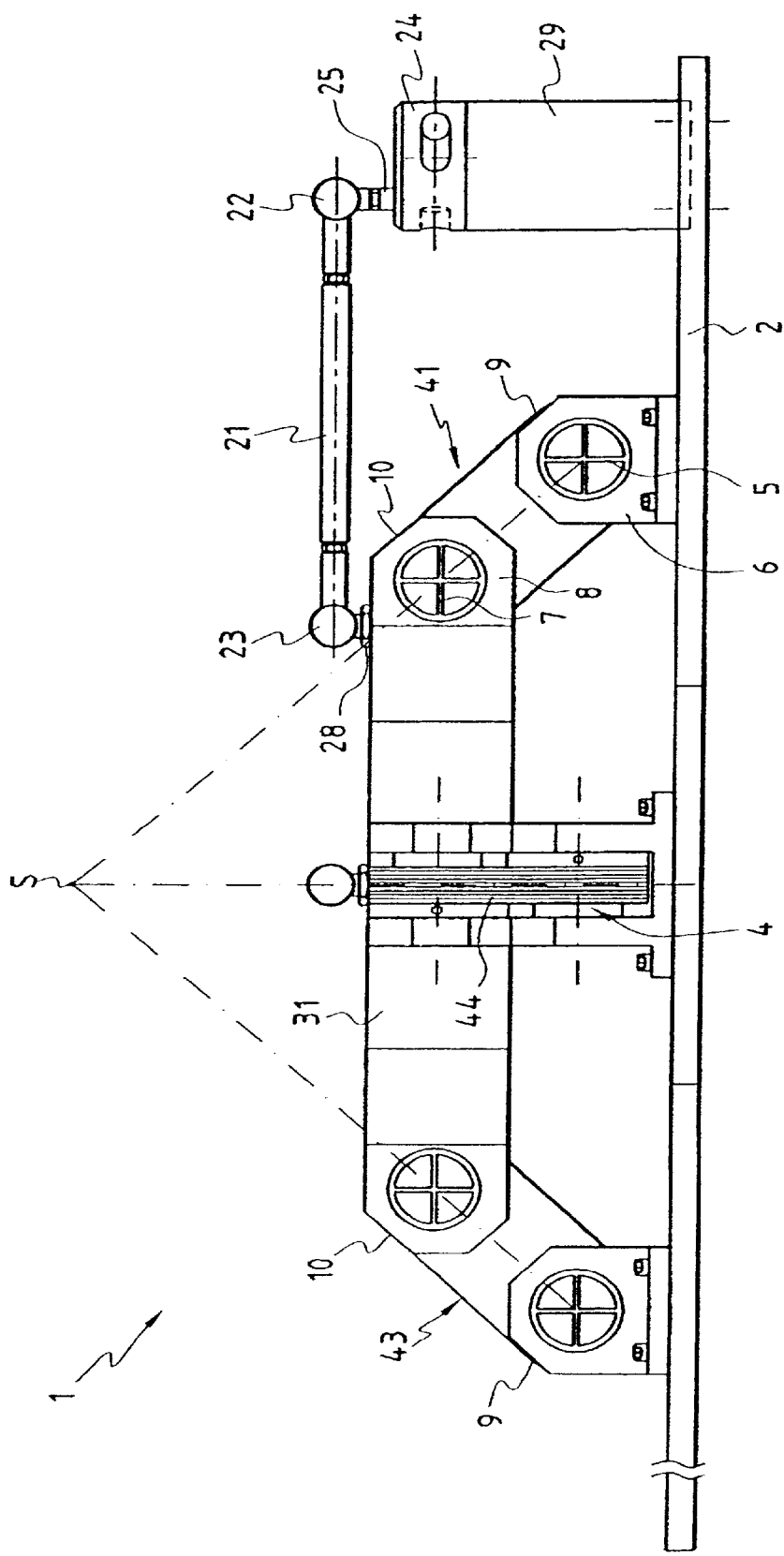
FIG. 3 is a diagrammatic side view of the FIG. 1 pointing device.

FIG. 3 shows that the pointing device forms the beginning of a pyramid structure whose edges are defined by extending the laminated structures 4. The laminations 45 making up each laminated structure 4 are thus concurrent in a position which can correspond to the initial configuration of the pointing device, as shown in FIGS. 1 and 3. This disposition thus gives additional stiffness to the mechanism as a whole. In this position, these laminations when extended meet at a point S, as shown in FIG. 3. The point S defines the top of the pyramid whose base is embodied by the structure of the pointing device 1. One of the technical effects of the device of the present invention lies in the pyramid structure defined by extending the laminations of the moving link arms. If the center of gravity or inertia of the supported load coincides substantially with the top S of the pyramid when the load is connected to the pointing device, then the load is in a position where the influence of external vibration and movement is minimized. In other words, this disposition makes it possible to reduce the maximum force exerted in the laminations 45 when accelerations are imparted to the assembly. This makes it possible to lighten the device as a whole and to reduce the dynamic amplification coefficient as seen by the load.

The embodiment of the pointing device shown in the various figures accompanying the present description has four moving link arms for keeping the bracket 31 and/or the load at a substantially constant height relative to the first support element 2. Nevertheless, the invention is not limited to this number. The number of link arms could be three, five, or even more. This number depends on the structure desired for the pointing device. For example, FIG. 1 shows pointing device of the invention having four moving link arms 41, 42, 43, and 44 uniformly distributed around the bracket 31, thus defining the beginning of a square-based pyramid structure. Another embodiment having three link arms distributed uniformly about the bracket 31 (or load) would define the beginning of a triangle-based pyramid structure, and another embodiment having five link means would define the beginning of a pyramid structure based on a pentagon, and so on.

The pointing device of the invention thus makes it possible to support loads in a determined orientation while ensuring that the load has a stable position during transport or under conditions of use such as being close to machines that generate shocks, vibration, or movement. To optimize the stability of the load supported by the device 1 in a predetermined orientation, it is preferable for the center of gravity or inertia of the load to be not too far from the top S of the pyramid structure defined by the device.

To point a load supported by the device 1, two actuators 20 and 50 are disposed between the support element 2 and the bracket 31. The two actuators 20 and 50 can equally well be placed in different positions around the device 1, for example in the positions 30 and 40 shown in dashed lines. Each of the actuators shown in FIG. 1 comprises a stator element 29 disposed on the support element 2. The stator element 29 supports a turntable 24 which can be moved by an optionally motorized mechanism included inside the stator element 29. These actuators are of the type using connecting rods and ball-and-socket joints, i.e. each actuator is connected to the bracket 31 or indeed directly to the load via a connecting rod 21 having first and second ball-and-socket joints 22 and 23 at respective ends. A first end of the connecting rod 21 is connected to the turntable 24 via the first ball-and-socket joint 22 which is attached to a retaining element 25 disposed eccentrically on the turntable 24. The second end of the connecting rod 21 carrying the second ball-and-socket joint 23 is connected to the bracket 31 via another retaining element 28 fixed to the bracket 31. The connecting rod 21 can also be fixed directly to the structure of the load. Because of the first and second ball-and-socket joints provided at its ends, the connecting rod 21 is free to rotate about its attachment points on the actuator and on the bracket or the load. Consequently, by connecting the connecting rod to the top surface of the turntable in eccentric manner, any turning of the turntable is transformed by the connecting rod into linear movement applied to the point where the connecting rod is attached to the fork or the load. To further increase the stiffness of the assembly, a flexible element of structure analogous to that shown in FIG. 2 and associated with hinges similar to the hinges 9 and 10 shown in FIG. 1 can be used instead of the connecting rod, thus making it possible to replace the ball-and-socket joints by respective hinges each having a single degree of freedom and thus eliminating backlash at each end of the links. Like the retaining element 25 in the configuration with a connecting rod, a hinge with a single degree of freedom that is connected to an actuator should be fixed eccentrically on the turntable of the actuator.

The type of actuator used in the device of the invention is a function of the use made of the device. The pointing device 1 could equally well make use of linear actuators, for example. Nevertheless, actuators of the kind shown in the above-described embodiment have the advantage of being fixed to the support element 2 which is external to the pointing device 1 and the load it supports, thus firstly preventing the actuators from transmitting additional vibration to the load, and secondly avoiding increasing the mass of the load. Furthermore, the number of actuators is determined by the number of pointing angles desired. For example, a single actuator provides a single pointing angle whereas two actuators with connecting rods defining two intersecting directions make it possible to point about two angles.

For pointing purposes, the disposition of the actuators around the pointing device 1 is of little importance. It is the control relationship that is applied to the actuators which determines how the system points. The directions in which the rods extend which connect the actuators to the fork or the load to be pointed are determined as a function of how critical the stiffness relating to each of the degrees freedom is for the assembly in question.

Figure 4:
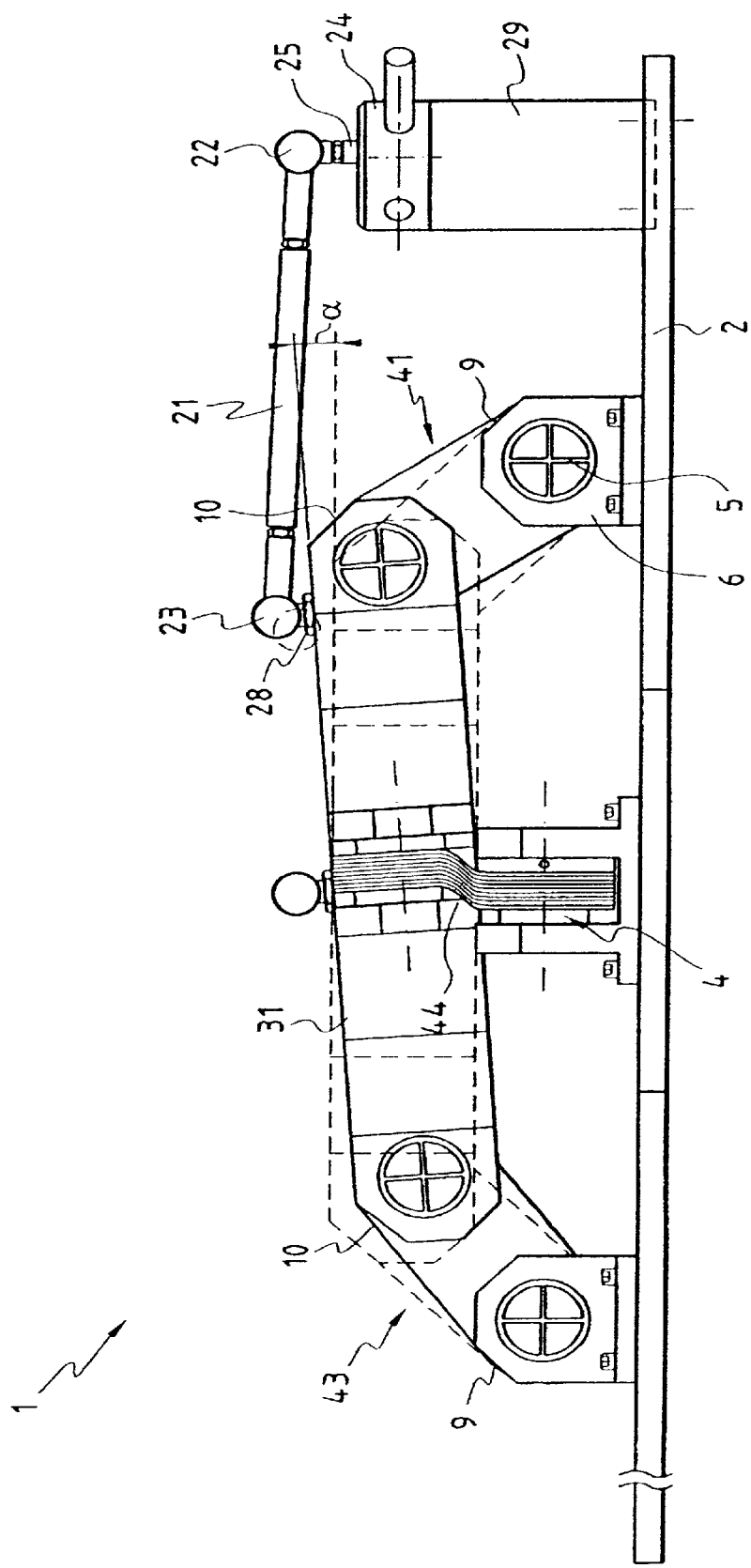
FIG. 4 is a diagrammatic side view of the FIG. 1 pointing device showing the device after it has been pointed.

Reference is now made to FIG. 4 which shows the pointing device 1 in a position after an actuator has moved away from the initial position of the device which is shown in this figure in dashed lines. The actuator shown in FIG. 4 is disposed in line with two opposite moving link arms as are the actuators 20 and 50 shown in FIG. 1 relative to the moving link means 42 and 44 or 41 and 43, respectively. Since the connecting rod 21 of the actuator 20 is fixed eccentrically on the turntable 24 of the actuator, any rotation of the turntable in either direction causes the connecting rod to move in translation, retracting it away from its initial position in which the concerning rod is attached to the actuator at its point closest to the bracket. This retraction movement of the connecting rod 21 due to the turntable 24 turning has the effect of applying traction to the bracket 31, or to the load if the connecting rod is directly connected thereto. Because of the two hinged ends 9 and 10 of each of the two moving link arms 42 and 44 disposed substantially in line with the traction direction of the connecting rod, the device 1 connected to the bracket 31 tilts so that the plane defined by the bracket takes up an angle alpha relative to the plane defined by the support element 2. Nevertheless, it should be observed that such tilting is made possible only because the other two moving link arms 41 and 43 in alignment in a direction perpendicular to that of the arms 42 and 44 are themselves flexible. As shown in FIG. 4, the laminated structure 4 of the arm 41 bends to allow the bracket to move longitudinally towards the actuator, with the arm 43 (not shown) bending symmetrically.

In the configuration comprising a pyramid structure on a square base (four arms and thus four edges) in which the actuator is in alignment with two moving link arms, these two opposite arms move only relative to their hinges each having a single degree of freedom, whereas the other two means that are disposed perpendicularly bend in a direction which is substantially orthogonal to the planes of rotation of their hinges. In contrast, in a configuration in which one or more actuators are not in alignment with two opposite arms (such as the actuators 30 and 40 shown in FIG. 1), or in a pointing device having an odd number of moving link arms, the link arms are then caused to move in a manner which combines pivoting about their respective hinges and bending or twisting of their flexible elements.

Similarly, the pointing achieved in FIG. 4 using the actuator 20 can take place only over a single angular range alpha. Combined movement of the actuator 20 and of another actuator 50 disposed perpendicularly to the actuator 20, as shown in FIG. 1, makes it possible to point the device over two angular ranges. Such a two-actuator configuration makes it possible to provide a range of orientations in two angles which is sufficient for pointing loads such as plasma thrusts mounted on satellites.

The position of the device as shown in FIG. 4 corresponds to the actuator 20 turning through 180°, which is the maximum displacement that this type of actuator can provide, i.e. the connecting rod 21 is retracted as far as possible. The tilt angles which can be obtained with the above-described device have a maximum of about 30°.

If the actuators used in the device are irreversible, then a determined orientation of the load can be held without powering the actuators. Thus, because of the structural stiffness obtained with the device of the invention, a load can be held in a determined orientation while continuing to be protected from disturbing phenomena in the surroundings.

Figure 5:
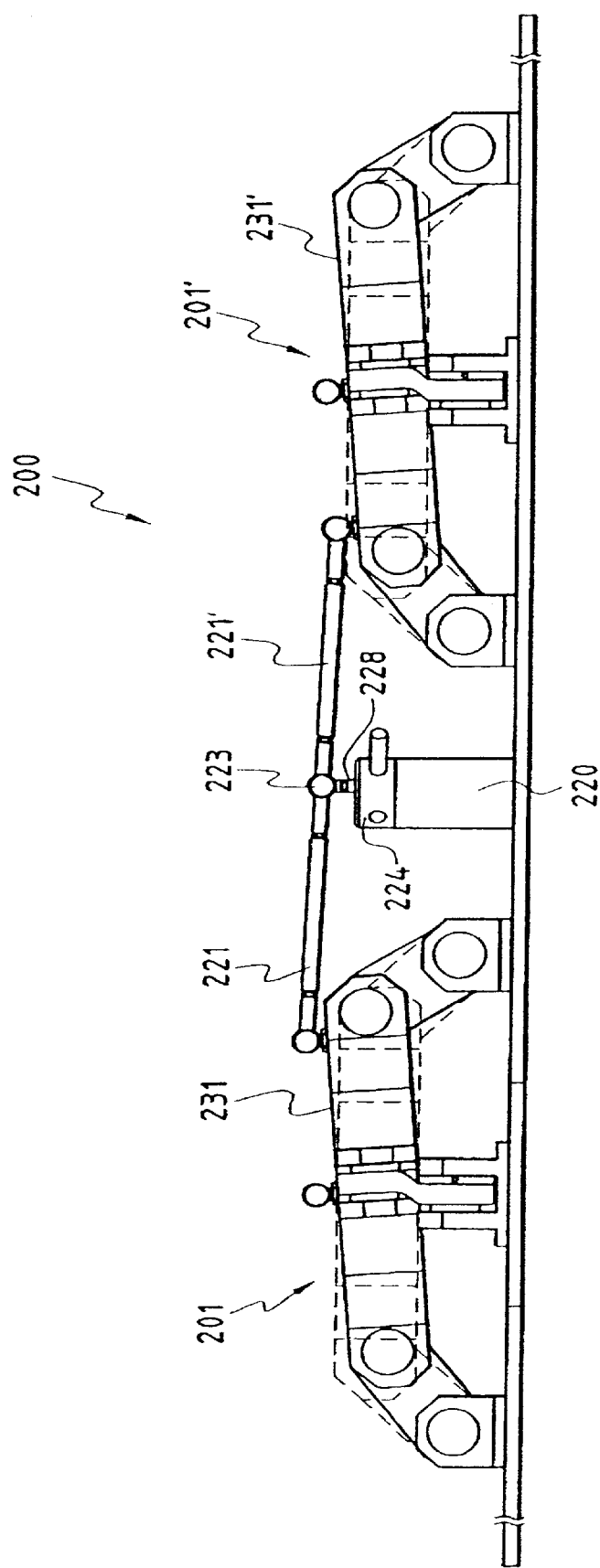
FIG. 5 is a diagrammatic side view of a pointing system comprising two pointing devices constituting an embodiment of the invention.

The fields of application of the pointing device are not limited to using a single assembly made up of a load supported by the device. For reasons of safety on vehicles in orbits that are difficult to access, for example, it can be essential to duplicate the supported load (antennas, light transmitters, . . . ) in order to be able to mitigate a failure of one of them. Still by way of example, in order to perform attitude or positioning correction on a satellite by plasma thrust, a system comprising a plurality of plasma thrusters each supported by its own pointing device can be necessary. FIG. 5 shows a pointing system 200 comprising two devices 201, 201' that are similar to the device described and that are disposed side by side symmetrically relative to an actuator 220. The pointing device 201 is connected to the actuator 220 by a connecting rod 221 and the device 201' is connected to the same actuator 220 by a second connecting rod 221'. The connecting rods 221 and 221' are attached to a retaining element 228 fixed eccentrically on the turntable 224 of the actuator by means of a common ball-and-socket joint 223 at the corresponding ends of the connecting rods 221 and 221'. In this configuration, when the turntable 224 is turned, the connecting rod 221 applies traction to the bracket 231 of the device 201 while the connecting rod 221' exerts opposite thrust on the bracket 231' of the device 201'. These forces exerted on the brackets 231 and 231' cause them both to tilt in the same direction.

The system 200 having two pointing devices with a common actuator presents an additional advantage concerning balancing of the resulting assembly. Since the actuator is connected symmetrically to both devices 201 and 201', the forces exerted by the devices on either side of the actuator are in equilibrium on the actuator. The person skilled in the art will readily understand that the pointing system 200 as shown in FIG. 5 can have an arbitrary number of pointing devices connected in series one after another by common actuators. In any event, it is necessary to ensure that the control relationship applied to the actuators common to two adjacent devices match each other.

Figure 6:
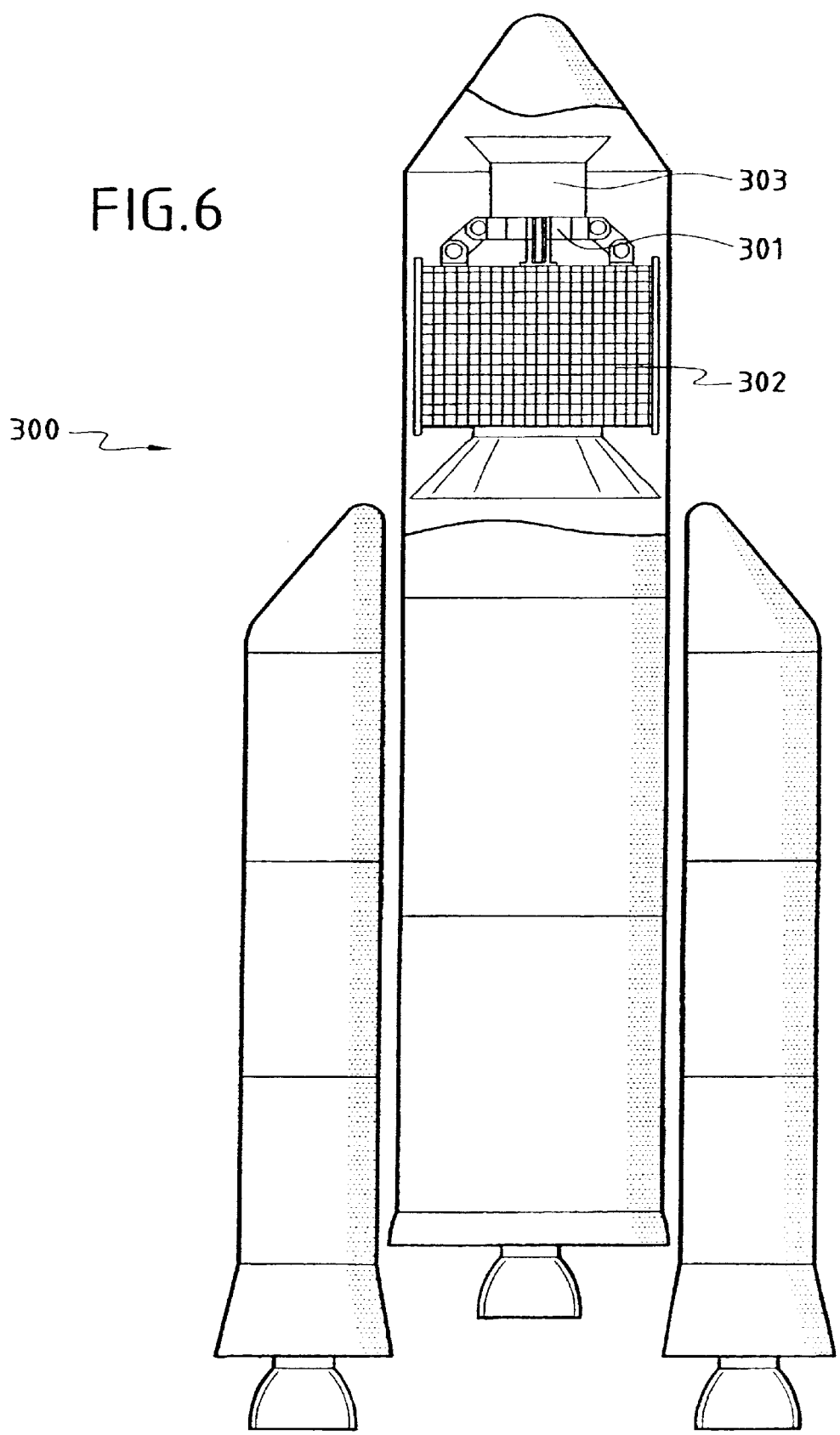
FIG. 6 is a diagrammatic view of a launcher fitted with an onboard pointing system constituted an embodiment of the invention.

FIG. 6 shows an application of the device of the invention. The pointing device is described above for reasons of clarity as having a bracket only, but in this figure it is shown as a part of an onboard system comprising a satellite 302 which supports a load via a pointing device 301 of the invention, which load is constituted by a plasma thruster 303. The device 301 is connected directly to the top structure of the satellite 302 which then constitutes the above-described support element. The plasma thruster 303 is thus supported in the height direction relative to the top structure of the satellite 302 by the moving link arms of the device 301. As explained above, the plasma thruster can be connected directly to the link arms via its own external structure or it can be fixed to a bracket which is in turn connected to the link arms of the pointing device.

Because of the pyramid-based shape of the device defined by the top S of the pyramid coinciding substantially with the center of gravity or inertia of the supported load, it is possible to support loads or components that are very sensitive to external disturbances even in severe environments. In the particular case of a plasma thruster fitted to a satellite which needs to be carried by a space launcher, for example, the cathodes of the thruster which need to be thermally insulated are mounted in a cantilevered-out configuration which makes them very sensitive to external accelerations. In addition, the anodes of plasma thrusters are made of ceramics, a material which is well known for being damaged when subjected to vibration.

The pointing device of the present invention thus provides an economic and reliable solution for supporting and pointing sensitive loads in disturbing environments. Unlike prior art devices, the present device presents not only the advantage of being compact and thus easy to integrate given its low height, but also of being lightweight. These advantages become even more significant when the device is for including in onboard systems, a field where strengths associated with weight, size, reliability, and cost are of prime importance when validating such devices.

What is claimed is:

1. A pointing device for supporting a load on a support element, said load being supported above said support element by moving link means, wherein said moving link means comprise at least three distinct link arms distributed around the load, each link arm comprising a flexible element having a first end connected to the support element via a first hinge having a single degree of freedom, and a second end connected to the load via a second hinge having a single degree of freedom, and wherein said pointing device further comprises at least one means for transmitting movement disposed between the support element and the load to point said load relative to said support element.

2. A device according to claim 1, wherein the load further comprises a fixing bracket, said bracket being connected to said at least three link arms.

3. A device according to claim 1, wherein, in each link arm, the first hinge has a first pin supporting the first end of the flexible element, said first pin being fixed to the support element by a fixing member, and wherein the second hinge comprises a second pin supporting the second end of said flexible element, said second pin being fixed to the load by a fixing member, said first and second pins of each link arm being parallel to each other and perpendicular to the flexible element when the device is in its initial position.

4. A device according to claim 1, wherein at least one movement transmission means comprises an actuator formed by a stator element fixed to the support element, said stator element supporting a turntable having a retaining element fixed eccentrically on said turntable and having attached thereto a first ball-and-socket joint disposed at one end of a connecting rod, a second ball-and-socket joint disposed at the opposite end of said connecting rod being attached to a retaining element disposed on the supported load, said first and second ball-and-socket joints provided at the ends of the connecting rod being free to rotate about their respective retaining elements.

5. A device according to claim 1, wherein said at least one movement transmission means comprises an actuator formed by a stator element fixed to the support element, said stator element supporting a turntable having a first hinge with a single degree of freedom fixed eccentrically on said turntable and connected to a first end of a flexible element, the second end of said flexible element being connected to the load via a second hinge having a single degree of freedom.

6. A device according to claim 4, wherein the stator element comprises a motor for positioning the turntable.

7. A device according to claim 4, wherein the stator element comprises a mechanism for driving the turntable, said mechanism being irreversible.

8. A pointing device according to claim 1, wherein the flexible element comprises a laminated structure made up of a stack of a plurality of laminations.

9. A device according to claim 8, wherein each of the laminations of the plurality of laminations comprises a metal lamination covered in a resilient material.

10. A device according to claim 9, wherein the metal constituting said lamination is stainless steel and wherein the resilient covering material is vulcanized rubber or silicone compression-bonded on the metal.

11. A device according to claim 1, comprising two movement transmission means disposed in two distinct directions.

12. A device according to claim 1, wherein said moving link means comprise four link arms disposed uniformly around the supported load.

13. A device according to claim 1, wherein said moving link means comprise five link arms distributed uniformly around the supported load.

14. A device according to claim 1, wherein the support element is a portion of the external structure of an apparatus.

15. A device according to claim 1, wherein the load comprises a plasma thruster, an antenna, a light emitter, or a light receiver.

16. A pointing system comprising a plurality of pointing devices according to claim 1, said devices being placed side by side and two adjacent devices using at least one movement transmission means in common.

17. A system onboard a launcher, said system comprising an apparatus having at least one load supported by a pointing device according to claim 1.

* * * * *